United States Patent [19]

Kapuscinski et al.

[11] Patent Number: 5,356,999
[45] Date of Patent: Oct. 18, 1994

[54] MULTIFUNCTIONAL VISCOSITY INDEX IMPROVERS BASED ON POLYMERS CONTAINING SULFONAMIDES

[75] Inventors: Maria M. Kapuscinski, Carmel; Benjamin J. Kaufman, Hopewell Junction; Robert T. Biggs, Walden, all of N.Y.

[73] Assignee: Texaco Inc., White Plains, N.Y.

[21] Appl. No.: 605,069

[22] Filed: Oct. 29, 1990

[51] Int. Cl.5 .................. C08F 269/00; C10L 1/14
[52] U.S. Cl. ..................... 525/286; 252/33; 252/34; 525/299; 525/301
[58] Field of Search .............. 252/33, 34; 525/299, 525/307, 286

[56] References Cited

U.S. PATENT DOCUMENTS 4,144,181 3/1979 Elliott et al. .................. 252/33
4,160,739 7/1979 Stambaugh et al. ............ 252/34

Primary Examiner—John Kight, III
Assistant Examiner—Shelley A. Dodson
Attorney, Agent, or Firm—Henry H. Gibson

[57] ABSTRACT

Multifunctional viscosity index improvers for lubricating oils containing an EPM or EPDM polymer onto which has been grafted an unsaturated reactive monomer and thereafter reacted with amines containing sulfonamide units.

4 Claims, No Drawings

MULTIFUNCTIONAL VISCOSITY INDEX IMPROVERS BASED ON POLYMERS CONTAINING SULFONAMIDES

BACKGROUND OF THE INVENTION

This invention relates to a novel multi-functional lubricant additive which is a dispersant, anti-oxidant and antiwear viscosity index (VI) improver additive when employed in a lubricating oil composition.

It is well known to those skilled in the art, that hydrocarbon lubricating oils must be formulated by addition of various additives to improve their properties.

In the case of lubricating oils, typified by those employed in railway, automotive, aircraft, marine etc., service, it is found that they become degraded during use due inter alia to formation of sludge which may be generated by deterioration of the oil or by introduction of undesirable components from other sources including the fuel or the combustion air. In order to maintain and improve the properties of the lubricating oil, various additives have heretofore been provided; and these have been intended to improve the viscosity index, dispersancy, oxidative stability, antiwear properties, etc.

It is, therefore, an object of this invention to provide an additive system which imparts to lubricating oils these improved properties of viscosity index, dispersancy, oxidative stability, and antiwear properties. Other objects will be apparent to those skilled in the art.

DISCLOSURE STATEMENT

The art contains many teachings on the use of polymer additives in lubricating oil compositions. Ethylene-propylene copolymers and ethylene-alpha olefin non-conjugated diene terpolymers which have been further derivatized to provide bifunctional properties in lubricating oil compositions illustrate this polymer type of oil additive.

U.S. Pat. No. 3,522,180 patent discloses a method for the preparation of an ethylene-propylene copolymer substrate effective as a viscosity index improver for lubricating oils.

U.S. Pat. No. 4,089,794 patent discloses ethylene copolymers derived from ethylene and one of more ($C_3$ to $C_{28}$) alpha olefin solution grafted with an ethylenically-unsaturated carboxylic acid material followed by a reaction with a polyfunctional material reactive with carboxyl groups, such as a polyamine, a polyol, or a hydroxylamine which reaction product is useful as a sludge and varnish control additive in lubricating oils.

U.S. Pat. No. 4,137,185 patent discloses a stabilized imide graft of an ethylene copolymer additive for lubricants.

U.S. Pat. No. 4,146,489 patent discloses a graft copolymer where the backbone polymer is an oil-soluble ethylene-propylene copolymer or an ethylene-propylene-diene modified terpolymer with a graph monomer of C-vinylpyridine or N-vinylpyrrolidone to provide a dispersant VI improver for lubricating oils.

U.S. Pat. No. 4,820,776 patent discloses lubricants and fuel oils of improved properties containing ethylene-propylene copolymer derived with N-vinyl pyrrolidone and phenothiazine.

U.S. Pat. No. 4,320,019 patent discloses a multipurpose lubricating additive prepared by the reaction of an interpolymer of ethylene and a ($C_3$–$C_8$) alpha-monoolefin with an olefinic carboxylic acid acylating agent to form an acylating reaction intermediate which is then reacted with an amine.

U.S. Pat. No. 4,764,304 patent discloses a lubricating oil dispersant VI improver composition containing an additive prepared by the reaction of an olefin copolymer and an unsaturated isocyanate to form reactive intermediate which is then reacted with heterocyclic amines.

U.S. Pat. No. 4,340,689 patent discloses a process for grafting a functional organic group onto an ethylene copolymer or an ethylene-propylene-diene terpolymer.

U.S. Pat. No. 4,357,250 patent discloses a reaction product of a copolymer and an olefin carboxylic acid via the "ene" reaction followed by a reaction with a monoamine-polyamine mixture.

U.S. Pat. No.4,382,007 patent discloses a dispersant - VI improver prepared by reacting a polyamine-derived dispersant with an oxidized ethylene-propylene polymer or an ethylene-propylene diene terpolymer.

U.S. Pat. No. 4,144,181 patent discloses polymer additives for fuels and lubricants comprising a grafted ethylene copolymer reacted with a polyamine, polyol or hydroxylamine and finally reacted with an alkaryl sulfonic acid.

The disclosures in the forgoing patents which relate to VI improvers and dispersants for lubricating oils, namely U.S. Pat. Nos. 3,522,180, 4,089,794, 4,137,185, 4,144,181, 4,146,489, 4,320,019, 4,340,689, 4,357,250, 4,382,007, 4,820,776, and 4,764,304 are incorporated herein by reference.

An object of this invention is to provide a novel derivatized polymer composition which imparts viscosity index improving, dispersant, antioxidant and antiwear activity to lubricating oil compositions.

Also another object is to provide a process for preparing a derivatized copolymer with graft functional monomers to form a reactive intermediate which is then reacted with an amine substituted sulfonamides to yield a modified copolymer which performs as a viscosity index improver, dispersant, antioxidant and antiwear agent in lubricating oil or to provide a process for preparing a derivatized polymer with N-methyl-N-nitroso-p-toluene-sulfonamide (diazaid) via "ENE" reaction during the mastification.

Still another object of this invention is to provide a multi-functional lubricant additive effective for imparting viscosity index, dispersant, antioxidant, and antiwear properties to a lubricating oil composition.

SUMMARY OF THE INVENTION

The present invention is directed to a two-step process of making multifunctional VI improvers based on a polymer prepared by grafting olefin copolymers being a polymer base with monomer containing reactive groups such as anhydride, epoxide, isocyanate or azlactone, then post-reacted with amine substituted sulfonamide or sulfanilamide.

The invention is also directed to a method of making a multifunctional VI Improver in a grafting process using olefin copolymers as a polymer base and diazald as a grafting monomer. The grafting reaction is performed under elevated temperatures in a mastification process using Bramley-Beken Mixer.

The following procedure is used to make the new multifunctional VI improvers in a two-step process. First, an unsaturated monomer is grafted onto polymer under elevated temperatures with addition of a free radical initiator. The grafting reaction is followed by reaction with amine. The following reactions illustrate the process of invention:

1. Grafting reaction

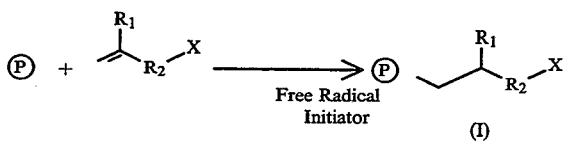

wherein P is a polymer selected from the group consisting of ethylene propylene copolymer, ethylene propylene diene terpolymer, hydrogenated styrene-butadiene copolymer, styrene hydrogenated isoprene or butadiene copolymer, and hydrogenated isoprene polymer; $R_1$ is a hydrogen or an organic linear, cyclic or heterocyclic, and aromatic or heteroaromatic group composed of hydrocarbon and/or one or more atom of oxygen, nitrogen, sulfur or phosphorus; and $R_2$ is an organic linear, cyclic or heterocyclic, and aromatic or heteroromatic unit composed of hydrocarbon and/or one or more atom of oxygen, nitrogen, isocyanate, azlactone chloride, ketone aldehyde group or ester group.

2. Capping reaction

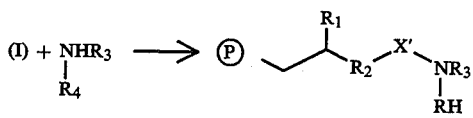

where:
$R_3$ is H or $R_2$
$R_4$ is $R_1$
$X'$ is a unit derived from X

The novel reaction product of the invention preferably is prepared using ethylene-propylene copolymer (EPM) or ethylene-propylene diene terpolymer (EPDM) as a polymer base, maleic anhydride as a functionalizing agent and amino-substituted sulfonamide such as sulfisoxazole, sulfamethazine, sulfadiazine, sulfamethoxazole or sulfisomidine.

In the one step process, diazald is grafted directly onto solid EPDM via an ENE reaction between the nitrosogroups and double bonds in copolymer. The process can be performed during mechanical shearing of the polymer by mastification in the Bramley-Beken Mixer by extrusion in the extruder or by any other suitable mechano-chemical process. The process can also be performed in the polymer solution.

The lubricant additive of the present invention comprises an oil of lubricating viscosity and an effective amount of the novel reaction product. The lubricating oil will be characterized by having viscosity index improver, dispersancy, antiwear and antioxidant properties. The methods of preparation are also contemplated.

DESCRIPTION OF THE INVENTION

This invention as discussed briefly above, is directed to a polymer comprising an oil-soluble, substantially linear, carbon-carbon backbone polymer bearing functional and units thereon, derived from an unsaturated monomer containing reactive groups such as maleic anhydride, glycidyl methacrylate, isocyanatoethyl methacrylate or vinyl azlactone and amines containing sulfonamide units.

This invention is also directed to a polymer derivatized with sulfonamide containing a nitroso group such as diazald (N-methyl-N-nitroso-p-toluene sulfonamide).

The charge polymer which may be employed in the practice of the present process of this invention may include an oil-soluble, substantially linear, carbon-carbon backbone polymer. Typical carbon-carbon backbone polymers, prepared from monomers bearing an ethylenically unsaturated polymerizable double bond, which may be employed include homopolymers or copolymers prepared from a monomer containing the grouping

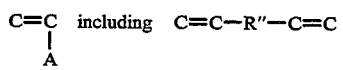

wherein A may be a hydrogen, hydrocarbon such as alkyl, aryl (particularly phenyl) etc., —OOCR typified by acetate or less preferred acyloxy (typified by —OOCR), halide, epoxy etc. R" may be divalent hydrocarbon typified alkylene, alkarylene, cycloalkylene, arylene, etc.

The polymer or copolymer substrate employed in the novel additive of the invention may be prepared from ethylene and propylene or it may be prepared from ethylene and a higher olefin within the range of $C_3$ to $C_{10}$ alpha-monoolefins. The polymer or copolymer substrate may be also prepared from isoprene, styrene or butadiene.

More complex polymer substrates often designated as interpolymers may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4cyclohexadiene, dicyclopentadiene, 5-ethylidene-2-norbornene, vinylnorbornene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 5-ethylidene-2-norbornene.

The polymer and copolymers prepared from the above mentioned monomers having short and long branches or star shape structure may also be employed.

The preferred carbon-carbon backbone polymers include those selected from the group consisting of ethylene-propylene copolymers (EPM or EPR) and ethylene-propylene-diene terpolymers (EPDM or EPT).

When the charge polymer is an ethylene-propylene copolymer (EPM), it may be formed by copolymerization of ethylene and propylene under known conditions preferably Ziegler-Natta reaction conditions. The preferred EPM copolymers contain units derived from the ethylene in amount of 40–90 mole %, preferably 55–80 mole %, say 59 mole %, the remainder being derived from propylene.

The molecular weight $\overline{M}_n$ of the EPM copolymers which may be employed may be about 5,000 to about 1,000,000, preferably about 20,000 to about 200,000, and most preferably about 80,000. The molecular weight distribution may be characterized by $\overline{M}_w/\overline{M}_n$ of less than about 15, preferably 1.2–10, say 1.8.

Illustrative EPM copolymers which may be employed in practice of the process of this invention may be those set forth below in Table I, the first listed being preferred.

TABLE I

A. The EPM marketed by Copolymer Rubber and Chemical Corporation containing 59 mole % of units derived from ethylene and 41 mole % of units derived from propylene, having a molecular weight $\overline{M}_w$ of 140,000 and a $\overline{M}_w/\overline{M}_n$ of 1.6

B. The Epcar 505 brand of EPM marketed by B. F. Goodrich Co., containing 50 mole % of units derived from ethylene and 50 mole % of units derived from propylene, having a $\overline{M}_n$ of 25,000 and a polydispersity index of 2.5.

C. The Esprene brand of EPR marketed by Sumitomo Chemical Co., containing 55 mole % of units derived from ethylene and 45 mole % of units derived from propylene and having a $\overline{M}_n$ of 25,000 and polydispersity index of 2.5.

When the charge polymer is ethylene-propylene-diene terpolymer (EPT or EPDM), it may be formed by copolymerization of ethylene, propylene, and diene monomers- The diene monomer is commonly a non-conjugated diene typified by dicyclopentadiene; 1,4-hexadiene; ethylidene norbornene or vinyl norbornene. Polymerization is effected under known conditions generally comparable to those employed in preparing the EPM products. The preferred terpolymers contain units derived from ethylene in amount of 40–90 mole %, preferably 50–65 mole %, say 59 mole % and units derived from propylene in an amount of 20–60 mole %, preferably 30–50 mole %, say 41 mole % and units derived from diene third monomer in amount of 0.2–15 mole %, preferably 0.3–3 mole %, say 0.5 mole %. The molecular weight $\overline{M}_n$ of the terpolymers may typically be about 5,000 to about 500,000, preferably about 20,000 to about 200,000, and most preferably about 80,000. Molecular weight distribution of the useful polymers is preferably narrow viz a $\overline{M}_w/\overline{M}_n$ of typically less than 10, preferably 1.5–5, say about 2.2.

Illustrative EPT (EPDM) terpolymers which may be employed in the practice of the present process may be those set forth below in Table II, the first listed being preferred.

TABLE II

A. The sheared Epsyn 4106 brand of EPT marketed by Copolymer Rubber and Chemical Corp., containing 59 mole % of units derived from ethylene, 40.5 mole % of units derived from propylene, and 0.5 mole % of units derived from ethylidene norbornene and having a $\overline{M}_w/\overline{M}_n$ of 2.2 and a molecular weight $\overline{M}_n$ of 80,000.

B. The Ortholeum 5655 brand of EPT marketed by DuPont containing 62 mole % of units derived from ethylene, 36 mole % of units derived from propylene, and 2 mole % of units derived from 1,4-hexadiene and having a $\overline{M}_n$ of 75,000 and a polydispersity index $\overline{M}_w/\overline{M}_n$ of 2.

C. The Ortholeum 2052 brand of EPT marketed by DuPont containing 62 mole % of units derived from ethylene, 36 mole % of units derived from propylene, and 2 mole % of units derived from 1,4-hexadiene and having a $\overline{M}_n$ of 35,000 and a polydispersity index $\overline{M}_w/\overline{M}_n$ of 2.

D. The Royalene brand of EPT marketed by Uniroyal containing 62 mole % of units derived from ethylene, 37 mole % of units derived from propylene, and 3 mole % of units derived from dicyclopentadiene and having a $\overline{M}_n$ of 100,000 and a polydispersity index $\overline{M}_w/\overline{M}_n$ of 2.5.

E. The sheared Epsyn 40A brand of EPT marketed by Copolymer Rubber and Chemical Corp., containing 60 mole % of units derived from ethylene, 37 mole % of units derived from propylene, and 3 mole % of units derived from ethylidene norbornene and having a $\overline{M}_n$ of 140,000 and a polydispersity index $\overline{M}_w/\overline{M}_n$ of 2.

It is a feature of the process of this invention that the additive is prepared in two-step process. In the first step a graft reactive monomer is grafted in the presence of a free radical initiator. In the second step, an amine substituted phenothiazine is reacted with the pendant reactive groups of the said polymer.

TWO-STEP PROCESS

The Graft Functional Monomer

It is a feature of the process of this invention that the graft functional monomers which may be employed (within a polymeric configuration) may be characterized by the presence of units containing an ethylenically unsaturated carbon-carbon double bond and anhydride, epoxide, isocyanate aldehyde or azlactone group. Although the graft monomer may contain more than one ethylenically unsaturated carbon-carbon double bond or reactive group in a preferred embodiment it may contain one of each. Graft monomers containing more than one ethylenically unsaturated carbon-carbon double bond are much less preferred because of the high probability of cross-linking during subsequent reaction.

According to the present invention, the following graft functional monomers may be used:

maleic anhydride
glycidyl methacrylate
allyl glycidyl ether
isocyanatoethyl methacrylate
croton aldehyde
vinyl azlactone
vinyl benzyl chloride It is a feature of the process of this invention that the graft functional monomer may be grafted onto carbon-carbon backbone polymers.

The Grafting Reaction

In the practice of the process of this invention, 100 parts of charge EPM or EPT (EPDM) may be added to 100–1000 parts, say 300–60 parts of diluent-solvent. Typical diluent-solvent may be a hydrocarbon solvent such as mineral oil, n-hexane, n-heptane, or tetrahydrofuran. Preferred solvent may be a commercial hexane containing principally hexane isomers or a commercial mineral grafting oil. Reaction mixture may then be heated under nitrogen to reaction conditions of 60° C.–180° C., preferably 150° C.–170° C., say 155° C. When n-hexane or other low boiling solvent is used, reaction is carried out in pressure reactor at 15–300 psig, preferably 180–220 psig, say 200 psig.

A graft monomer, typically maleic anhydride is admitted in an amount of about 1–40 parts, preferably 2 to 5 parts. There is also added a free radical initiator in solution in grafting solvent. Typical free radical initiators, may include dicumyl peroxide, di-t-butyl peroxide, benzoyl peroxide, di-isopropyl peroxide, azobisisobutyro-nitrile, etc. The solvent is preferably the same as that in which the EPM or EPT is dissolved. The initiator may be added in amount of 0.2–40 parts, say 2 part in 0.8–120 parts, say 4 parts of solvent. The preferred free radical initiator is a dicumyl peroxide (DICUP).

The grafting reaction is carried out at a temperature at least as high as the decomposition temperature of the initiator, typically 150°–160° C. or higher, during which time bonding of the graft reactive monomer onto the base EPM or EPT polymer occurs.

The product graft polymer may be characterized by the presence of pendant reactive groups bonded to the polymer backbone thorough the residue of the graft monomer.

Typically the graft product polymer may by contain 0.1–20, say 0.4 units derived from graft monomer per 1000 carbon atoms of the charge backbone polymer.

The Amine Reactant

In practice of the present process, the graft polymer bearing pendant reactive groups may be reacted with an amine containing sulfonamide units.

The amine substituted sulfonamide may be characterized by the following formula:

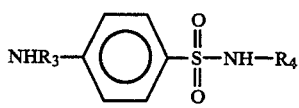

where:
- $R_3$ is a hydrogen or an organic radical which may contain linear, cyclic, heterocyclic or heteroaromatic units which may contain one or more atom of oxygen, nitrogen sulfur or phosphorous.
- $R_4$ is an organic group which may contain linear, cyclic, heterocyclic or heteroaromatic units which may contain one or more atom of oxygen, nitrogen, sulfur or phosphorous.

The amine which may be employed in this invention are:
Sulfisoxazole
Sulfamethazine
Sulfadiazine
Sulfamethazole
Sulfisomidine
Sulfathiazole

The Amidization Reaction

Amidization may be carried out by adding the graft polymer containing reactive groups to a reaction vessel together with inert-diluent solvent. In the preferred embodiment, reaction may be carried out in the same solvent and in the same reaction medium as that in which the polymer is dissolved.

An amine, typically sulfisoxazole is added to the reaction vessel. The amount of amine added is preferably 0.1–5 moles, say 1.2 moles per mole of reactive group bonded to the polymer or reactive functional monomer charged. Typically this may correspond to 0.05–0.5 moles, preferably 0.008 to 0.18 moles of amine per 100 g of polymer.

The amidization reaction is carried out over 0.1–20 hours, say 4 hours at 60° C.–300° C., say 200° C. with agitation. For ease of handling, the final product may be diluted to form a solution of 4–20 parts, say 13 parts of polymer in 80–95, say 87 parts of mineral oil such as a SUS 100 oil typified by SNO-100.

ONE-STEP PROCESS

In a one-step process, the reaction can be performed in a Bramley-Beken Mixer during mastification under elevated temperatures as follows: 20–200 g of EPDM is charged to the Lab Bramley-Beken Mixer. The rubber is ground at room temperature and 1–20 g of nitrososulfonamide typically diazald is charged. Then, the mixture is heated with stirring at a temperature of 140°–190° C. for 0.5–4 hours under nitrogen with an initial short period of time (1 to 60 minutes) of air flowing.

To the product prepared by the above method enough mineral oil is added to obtain a fluid concentrate at room temperature (6–14 wt % polymer solution). The fluid solution (a lubricant additive) is used for further testing.

The grafting reaction of the nitrososulfonamide in polymer solution can be performed as follows:

A solution containing 10–30 parts of EPDM and 90–70 parts of solvent such as mineral oil or n-hexane is prepared. The stirred solution is heated at 150°–300° C. in the presence of nitrogen to form a homogeneous solution. 0.06–6 parts of diazald is charged. The mixture is stirred at 150–300° C. (under nitrogen) for 0.5–5 hours. Typically, 20 parts of EPDM, 80 parts of mineral low sulfur oil, and 0.8 parts of diazald are used. The reaction mixture is maintained at 255±5° C. for 2 hours. Then, enough mineral oil is added to obtain a fluid concentrate at room temperature (6–14 wt. % polymer solution). The fluid solution (a lubricating additive) is used for further testing.

It is a feature of this invention that the so-prepared polymer solution in oil may find use in lubricating oils as multifunctional additive (e.g. viscosity index improvers which provide dispersancy, antioxidancy and antiwear properties, etc.) when present in effective amount of about 1.0 to about 20 wt %, preferably 3–15 wt %, preferably about 9 wt %.

Lubricating oils in which the multifunctional additives of this invention may find use may include automotive, aircraft, marine, railway, etc., oils; oils used in spark ignition or compression ignition; summer or winter oils, etc. Typically the lubricating oils may be characterized by a b.p. of about 570° F. to about 660° F., preferably 610° F.; an e.p. of about 750° F. to about 1200° F., preferably 1020° F.; an API gravity of about 25 to about 31, preferably about 29.

A typical lubricating oil in which the polymer of this invention may be present may be a standard SAE 5W-30 hydrocarbon motor oil formulation having the composition as set forth below in Table IV:

TABLE IV

| | Wt % |
|---|---|
| Base Oil | 82 |
| Viscosity Index Improver (additive of this invention) (10 w % ethylene-propylene copolymer in 90% inert oil) | 9 |
| Standard Additive Package: Polyisobutenyl (M1290)$_n$ succinimide (dispersant); calcium sulfonate (detergent); Zinc dithiophosphate (anti-wear); di-nonyl diphenyl amine (anti-oxidant); 4,4'-methylene-bis (2,6-di-t-butyl phenol) | 9 |

TABLE IV-continued

| | Wt % |
|---|---|
| (antioxidant) | |

Use of the additive of this invention makes it possible to readily increase the viscosity index by 25–40 units, say 35 units and to obtain improved ratings on the tests measuring the dispersancy of the system. The viscosity index is determined by ASTM Test D-445.

The present invention comprises making dispersant antiwear and/or antioxidant VI improvers by derivatizing hydrocarbon polymers such as ethylene-propylene copolymer (EPM), or ethylene-propylene-diene terpolymer (EPDM) with, e.g., graft reactive monomer and an amine substituted phenothiazine.

Addition of the above invention additives, to a lubricating oil, may be facilitated by use of a concentrate containing about 1 to about 20 wt. %, preferably about 4 to about 14 wt % of polymer.

The tests and analysis used, according to the present invention, are provided below.

TEST AND ANALYSIS

1. Oxidation Stability

The antioxidant activity of the new multifunctional VI improver was examined by a proprietary test called Bench Oxidation Test (BOT). In this test, the polymer solution is diluted with SNO-130 oil. The mixture is heated with stirring and air agitation. Samples are withdrawn periodically for analysis, by differential infrared analysis (DIR), to observe changes in the intensity of the carbonyl vibration band at 1710 cm$^{-1}$. Higher carbonyl group intensity indicates a lower thermal oxidative stability of the sample. The result reported, as oxidation index, indicates the change in the intensity of the carbonyl vibration band at 1710 cm$^{-1}$ after 144 hours of oxidation. A lower rating indicates better thermal oxidative stability of the mixture.

2. Dispersancy

The sample is blended into a formulated oil, not containing a dispersant, to form 10.0 wt. % viscosity index improver solution. That blend is tested for dispersancy in the prototype VE Test. In this test, the turbidity of an oil containing an additive is measured after heating the test oil to which has been added a standard blow-by. The result correlates with dispersancy and is compared to three standards (Excellent, Good, and fair) tested simultaneously with the test sample. The numerical rating decreases with an increase in dispersant effectiveness. Results above 100 indicate that the additive does not provide dispersant activity.

Antiwear Properties

Antiwear performance of a new VI improver were determined by Four-Ball Wear Test (MS-82-79, ASTM D-2266, ASTM4172). The VI improver solutions in formulated oil, having Kinematic Viscosity at 100° C. around 16 cSt were evaluated.

In this test four balls are arranged in an equilateral tetrahedron. The lower three balls are clamped securely in a test cup filled with lubricant and the upper ball held by a chuck which is motor driven causing the upper ball to rotate against the fixed lower balls. Load is applied in an upward direction through a weight/lever arm system. Heaters allow operation at elevated oil temperatures. The test speeds available for each tester are 600 rmp, 1200 rmp and 1800 rpm. Results are reported as average scar diameter (mm).

The amount of amino-sulfonamide derivative incorporated onto the OCP in the two-step process is determined by IR-analysis of isolated rubber. The rubber is isolated from solution by multiple precipitation using cyclohexane as a solvent and acetone as precipitator. The rubber (isolated as a solid) is dried in vacuum at 60° C. for 36 hours.

DESCRIPTION OF THE PREFERRED EMBODIMENTS

The practice of the process of this invention will be more apparent to those skilled in the art from the following examples wherein, as elsewhere in this specification, all parts are parts by weight unless otherwise set forth. Control examples are designated by an asterisk.

EXAMPLE 1

EPM containing about 0.01 moles at succinic anhydride groups (EPSA) per 100 g of polymer which was prepared at Copolymer Rubber and Chemical Corporation via free radical grafting reaction is used. 100 g of this rubber containing reactive pendant anhydride groups is dissolved in 566 parts of mineral SNO-100 oil by heating with mixing at 155° C. for 3 hours under a nitrogen blanket. Then, the temperature is increased to 200° C. and 1.92 wt parts of sulfisoxazole mixed into 32 wt.parts of surfonic L-46-7 is charged. The mixture is heated with stirring under nitrogen for 4 hours.

Then, the solvent neutral oil (SNO-100) is added to give a solution containing 13.0 wt % polymer. This solution is used for further testing.

EXAMPLE 2

The procedure of Example 1 is followed except that 2.0 wt parts of sulfamethazine instead of sulfisoxazole is used.

EXAMPLE 3

In this example, the reaction was performed in the laboratory Bramley-Beken Mixer. EPsyn 3106 was used as a polymer base. EPsyn 3106 manufactured by Copolymer Rubber and Chemical Corporation is containing approximately 60 mole % ethylene, 40 mole % propylene and 0.5 wt % ethylidene norbornene. Molecular weight (number average) is approx. 120,000 and polydispersity 2.2.

100 g of EPDM (EPsyn 3106) was charged to the mixer. The rubber is ground for 30 minutes and 4 g of diazald was charged. The mixture was heated with stirring under nitrogen to about 150° C. The mixer was kept open for 2 minutes to allow some air addition to the system. The mixture was stirred at 150° C. under nitrogen for 120 minutes. Then the mixture was cooled to room temperature under nitrogen and discarded from the mixer.

Next, a solvent neutral oil (SNO-100) is added to give a VI improver (fluid solution containing 9 wt. % polymer).

EXAMPLE 4*

In this example, 12.5 wt % EPSA solution in SNO-100 oil is prepared. EPSA, manufactured by Copolymer Rubber and Chemical Corporation of Baton Rouge, La., is an EPM grafted with approximately 0.01 mole of maleic anhydride. 100 wt parts of EPSA which is used in the Examples 1 and 2, is added to 700 wt parts of SNO-100. The mixture is heated to 155° C. with stirring and under nitrogen for 3 hours until the rubber is completely dissolved.

EXAMPLE 5*

In this example, 9 wt % EPsyn 3106 solution in mineral oil is prepared. 100 parts of EPDM which is used in the example 3, is added to 1100 parts of SNO-100. The mixture is heated to 155° C. with stirring and under nitrogen for 3 hours until the rubber is completely dissolved.

RESULTS

The evaluation data for the samples of Examples 1, 2, 3,4* and 5* are listed below in Tables I and II. The sample numbers are related to the example numbers.

As seen in the Table 1 samples of Examples 1 and 2 containing rubber with incorporated sulfonamide units show good antiwear and dispersant activity. The sample of Example 3 showed antiwear and antioxidant activity. The reference samples of examples 4* and 5* containing unmodified rubber does not show any dispersant or antiwear or antioxidant properties.

The above data indicate that EPM or EPDM copolymers modified by incorporating amine substituted sulfonamide via reacting with reactive pendant groups derived from unsaturated monomers such as maleic anhydride or by grafting of nitroso-toluene sulfonamide such as diazald form multifunctional VI improvers exhibiting dispersant, antiwear and antioxidant performance in motor oils.

The Sequential VE Engine test results are set forth below in Table II.

TABLE I

| PROPERTIES OF VI IMPROVERS | | | | |
|---|---|---|---|---|
| | SAMPLE | | | |
| | 1 | 2 | 4* | 5* |
| MATERIAL WT PARTS | | | | |
| EPSA (1) | 100 | 100 | 100 | — |
| EPDM (2) | — | — | — | 100 |
| Sulfisoxazole | 1.92 | — | — | — |
| Sulfamethazine | — | 2.0 | — | — |
| Sulfonic L-46-7 | 32.0 | 32.0 | — | — |
| Diluent Oil | 566.0 | 666.0 | 700 | 1011 |
| IR RESULTS | .47 | .43 | 0.0 | 0.0 |
| ANTIWEAR PROPERTIES (4) Avg. Scar Diameter. mm | .55 | .61 | 1.8 | 1.7 |
| BENCH DISPERSANCY (BVET Test) | | | | |

TABLE I-continued

| PROPERTIES OF VI IMPROVERS | | | | |
|---|---|---|---|---|
| | SAMPLE | | | |
| | 1 | 2 | 4* | 5* |
| RESULT | 65 | 73 | 190 | 200 |
| Standards | 32/45/90 → | | | |

(1) Ethylene propylene copolymer containing 0.01 mole of succinic anhydride groups per 100 g of polymer.
(2) Ethylene propylene copolymer containing about 0.5 mole % of ethylidene norbornene (EPsyn-3106).
(3) Ratio of % transmittance at 1720 cm$^{-1}$/722 cm$^{-1}$.
(4) Four Ball Wear test. Conditions: 1800 rmp, 40 kg, 200 F., 2 hrs. 5W-40 oil containing 9 wt. % of VI Improver.

TABLE II

| PROPERTIES OF VI IMPROVERS | | |
|---|---|---|
| | SAMPLE | |
| | 3 | 5* |
| MATERIAL WT PARTS | | |
| EPsyn 3106 | 100 | 100 |
| Diazald | 4.0 | — |
| Diluent Oil | 896 | 1011 |
| VISCOSITY INDEX (1) | 127 | 138 |
| IR SPECTRA 1600/722 CM$_{-1}$ (BAND HEIGHTS RATIO) | .29 | .0 |
| OXIDATION INDEX (2) | 9.0 | 19 |
| WEAR TEST (Four Ball) | | |
| Ford Specification (BJ-16-1) 600 rpm, 200 F., 120 min, 40 kg | | |
| Average scar diameter, mm | .73 | .78 |
| Wear MS-82-79, 60 min, 600 rpm | | |
| Average scar diameter, mm | | |
| 1 kg | 19 | 22 |
| 10 kg | 45 | 59 |
| 40 kg | 54 | 57 |

(1) 11.5 wt% solution of VI improver in pour depressed SNO-130 oil.
(2) Change in the intensity of the carbonyl group IR vibration at 1710 cm$^{-1}$ after 144 hours in BOT.

We claim:

1. A polymer containing a carbon-carbon backbone and pendant units derived from a nitroso-compound containing sulfonamide bonded thereon prepared in a one step process by an "ENE" reaction performed during a mechano-chemical processing of solid rubber mastification at a temperature of about 60° C. to about 180° C.

2. The polymer of claim 1 wherein said nitroso-compound is diazald.

3. The graft polymer containing a carbon-carbon backbone of claim 1, wherein said backbone polymer is a copolymer of ethylene-propylene or an ethylene-propylene-diene terpolymer.

4. The polymer of claim 1, wherein said backbone polymer is a copolymer of ethylene-propylene or a terpolymer of ethylene-propylene-diene.

* * * * *